UNITED STATES PATENT OFFICE.

WILHELM SCHUMACHER, OF OBERDOLLENDORF, GERMANY.

PROCESS OF MANUFACTURING ARTIFICIAL PAVING-STONES.

No. 809,225.      Specification of Letters Patent.      Patented Jan. 2, 1906.

Application filed December 11, 1903. Serial No. 184,842.

*To all whom it may concern:*

Be it known that I, WILHELM SCHUMACHER, a citizen of the Empire of Germany, residing at Oberdollendorf, in the Empire of Germany, have invented a new and useful Process of Manufacturing Artificial Paving-Stones, of which the following is a specification.

The artificial paving-stones used up to now have on account of different defects not found any general use. Most of these products—such as clay stones, clinkers, or the like—do not possess the required hardness and are therefore worn out too soon. Paving-stones made of other materials, such as the slag of copper-works, are sufficiently hard; but they become too smooth and slippery after being in use for a time. Other paving-stones, such as feldspar stones, are, though very hard, yet too friable. All these artificial paving-stones have therefore been found to be inferior to natural paving-stones.

My invention relates to a process of manufacturing artificial paving-stones from sintered bauxite—that is, material which is very hard and possesses at the same time a great toughness and resisting force against shocks and blows and does, moreover, on account of its porous structure, not become smooth. As is well known, bauxite is a hydrate of aluminium of the formula $$Al_2O_3 + 2H_2O$$

with a great amount of impurities, especially admixtures of ferric oxid, quartz, titan, and vanadium.

My process is as follows: Bauxite, especially that containing the ferric oxid to a considerable extent, is heated at a high temperature, if necessary, with the addition of fluxes 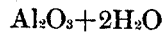 until it is perfectly sintered. It is then reduced to small pieces of a suitable fineness and mixed with a binding material, such as clay, cement, asphalt, or the like. The binding material must be of course in a powdered state, as usual in similar processes. The mixture is moistened with water, as usual, and molded to the desired form and finally burned. The so-obtained paving-stones are ready for use. It is easy to ascertain by trials the correct proportion between the sintered bauxite and the binder (averaging from fifteen to thirty per cent.) in order to obtain paving-stones that will always maintain a rough surface and will never become slippery.

I am aware of the United States Patent No. 555,207, granted February 25, 1896, to Brice for "artificial stone," in which a mixture is described as made of sand and clay in equal proportions, or of either of them, and broken stone or earth of any kind for producing a "bond," which is then ground. Two parts of this bond are next mixed with one part of sand and one part of clay, earth, or stone, all in a powdered condition and called the "filler." The mixture is afterward moistened with water and molded to the desired shape, dried, and burned. No bauxite is at all named, while in my method I use bauxite alone or in combination with a flux in place of the bond. Brice uses a cupola or blast-furnace for producing his bond, while I employ a rotary kiln of any known construction for heating and sintering the bauxite. Therefore both the composition and the process used by me widely differ from those described in Brice's patent. I am further aware of the United States Patent No. 578,351, granted March 9, 1897, to McConnell for "chrome brick," in which the method described consists in grinding chrome ore, adding, say, twenty-five per cent. of refractory clay, such as bauxite, and, say, two per cent. of milk of lime, grinding up the mixture in a wet condition, molding it to forms, and burning the latter. No bond is formed. The bauxite forms but a small portion, while chrome ore is the principal portion of the mixture. In my method I do not use any chrome ore at all, but exclusively sintered bauxite. Therefore my process is quite different from McConnell's process.

What I claim as my invention, and desire to secure by Letters Patent, is—

1. The herein-described method of producing artificial paving-stones, which consists in first heating bauxite at a high temperature until it is perfectly sintered, then reducing it to small pieces of a suitable fineness, next mixing it with a ground binding material (clay, cement, asphalt and the like), afterward moistening the mixture with water and molding it to stones and finally burning the stones.

2. The herein-described method of producing artificial paving-stones, which consists in first heating bauxite with the addition of a flux at a high temperature until it is perfectly sintered, then reducing it to small pieces of a suitable fineness, next mixing it with a ground binding material (clay, cement, asphalt and
5 the like), afterward moistening the mixture with water and molding it to stones and finally burning the stones.

In testimony whereof I have signed my name to this specification in the presence of two subscribing witnesses.

WILHELM SCHUMACHER.

Witnesses:
    GUSTAV ELSON,
    WILHELM KUPPER.